United States Patent
Blair

(10) Patent No.: US 9,628,340 B2
(45) Date of Patent: Apr. 18, 2017

(54) PROACTIVE OPERATIONS, ADMINISTRATION, AND MAINTENANCE SYSTEMS AND METHODS IN NETWORKS USING DATA ANALYTICS

(71) Applicant: Loudon Thomas Blair, Severna Park, MD (US)

(72) Inventor: Loudon Thomas Blair, Severna Park, MD (US)

(73) Assignee: Ciena Corporation, Hanover, MD (US)

( * ) Notice: Subject to any disclaimer, the term of this patent is extended or adjusted under 35 U.S.C. 154(b) by 101 days.

(21) Appl. No.: 14/270,011

(22) Filed: May 5, 2014

(65) Prior Publication Data

US 2015/0317197 A1 Nov. 5, 2015

(51) Int. Cl.
| | |
|---|---|
| *G06F 11/00* | (2006.01) |
| *H04L 12/24* | (2006.01) |
| *G06F 11/07* | (2006.01) |
| *G06N 7/00* | (2006.01) |

(52) U.S. Cl.
CPC .......... *H04L 41/147* (2013.01); *G06F 11/079* (2013.01); *G06N 7/005* (2013.01); *H04L 41/142* (2013.01); *H04L 41/16* (2013.01)

(58) Field of Classification Search
CPC ............. G06F 11/3409; G06F 11/3447; G06F 11/3452
USPC ................................................. 714/47.2, 47.3
See application file for complete search history.

(56) References Cited

U.S. PATENT DOCUMENTS

| | | | |
|---|---|---|---|
| 5,623,565 A | 4/1997 | Blair et al. | |
| 6,414,767 B1 | 7/2002 | Blair et al. | |
| 7,539,907 B1 * | 5/2009 | Johnsen ................ | G06F 11/008 714/26 |
| 7,730,364 B2 * | 6/2010 | Chang ................... | G06F 11/008 714/47.2 |
| 7,747,419 B2 * | 6/2010 | Lin ......................... | G06N 3/02 700/44 |
| 8,140,914 B2 * | 3/2012 | Murphy ................ | G06F 11/008 714/47.1 |
| 8,433,192 B2 | 4/2013 | Frankel et al. | |
| 8,456,984 B2 | 6/2013 | Ranganathan et al. | |
| 8,467,375 B2 | 6/2013 | Blair | |
| 8,626,791 B1 | 1/2014 | Lin et al. | |
| 2005/0091657 A1 | 4/2005 | Priem | |
| 2007/0152049 A1 * | 7/2007 | Bar ...................... | G06Q 10/087 235/385 |
| 2009/0232492 A1 | 9/2009 | Blair et al. | |
| 2012/0016607 A1 * | 1/2012 | Cottrell .............. | G05B 23/0229 702/62 |

(Continued)

*Primary Examiner* — Elmira Mehrmanesh
(74) *Attorney, Agent, or Firm* — Clements Bernard Walker PLLC; Christopher L. Bernard; Lawrence A. Baratta, Jr.

(57) ABSTRACT

A computer-implemented method, a system, and a network include receiving network data from a network and non-network sourced data from one or more external sources relative to the network; performing data mining on the network data and the non-network sourced data; developing a predictive analytics model based on the data mining; and performing predictive analytics on the network data and the non-network sourced data using the predictive analytics model to detect likely future failures in the network. The network can include a Software Defined Network (SDN) operating at any of Layers 0, 1, 2 and/or 3.

18 Claims, 5 Drawing Sheets

(56) References Cited

U.S. PATENT DOCUMENTS

| | | | |
|---|---|---|---|
| 2012/0173300 A1* | 7/2012 | Davenport | G06Q 10/063 |
| | | | 705/7.28 |
| 2012/0226824 A1 | 9/2012 | Trnkus et al. | |
| 2013/0121207 A1 | 5/2013 | Parker | |
| 2013/0124712 A1 | 5/2013 | Parker | |
| 2013/0177311 A1 | 7/2013 | Trnkus et al. | |
| 2013/0236169 A1 | 9/2013 | Gaudette et al. | |
| 2013/0259465 A1 | 10/2013 | Blair | |
| 2013/0290512 A1 | 10/2013 | Ngoo et al. | |
| 2013/0290520 A1 | 10/2013 | Ngoo et al. | |
| 2013/0332399 A1* | 12/2013 | Reddy | G06N 99/005 |
| | | | 706/12 |
| 2014/0075557 A1 | 3/2014 | Balabine et al. | |
| 2014/0098677 A1* | 4/2014 | Otung | H04L 41/145 |
| | | | 370/242 |
| 2014/0214745 A1* | 7/2014 | Walsh | H04L 41/147 |
| | | | 706/46 |

* cited by examiner

PROACTIVE OPERATIONS, ADMINISTRATION, AND MAINTENANCE SYSTEMS AND METHODS IN NETWORKS USING DATA ANALYTICS

FIELD OF THE DISCLOSURE

The present disclosure relates generally to networking systems and methods. More particularly, the present disclosure relates to proactive operations, administration, and maintenance (OAM) systems and methods using data analytics such as with software defined networking (SDN).

BACKGROUND OF THE DISCLOSURE

Network resiliency is of critical importance to network operators, service providers, and associated end users. Everyone expects "always on" network connectivity and any down time can result in lost revenue, opportunities, etc. As such, various OAM instrumentation techniques are available at each network level—layer 0 or the photonic layer, layer 1 or the time division multiplexing layer, layer 2—Ethernet, MPLS, etc., layer 3—IP, etc. Operators intently monitor OAM at all of the network levels. The existing approach to the monitoring of network health is explicit and deterministic. This is not a bad thing. However, today's OAM methods typically provide knowledge about network conditions in real time. For example, a network failure is identified at the time of the failure (or a short time after) so as to initiate a protection switch and OAM information provides guidance as to where the failure has occurred for reactive maintenance purposes. Pre-forward error correction (FEC) bit error rate (BER) does provide some advanced warning of the degradation of an optical signal but the change in BER value is typically very steep and so does not provide much advanced warning. Note that the correlation of explicit OAM information from different network sources exists today with a primary objective to help suppress the many alarms that can be created after a failure, for example. Such alarm correlation techniques are still reacting to an event after it has occurred and are not being used to predict possible future issues.

Modern, high-powered computing platforms are allowing the application of data mining techniques (aka "data analytics" or "big data") to services by helping them learn more about their subscribers' usage patterns. By processing a vast array of somewhat unrelated data associated with particulars such as usage patterns, applications, locations, client devices, etc., service providers aim to improve service value by focusing precisely on individual customer needs. In today's networks, the general area of data mining is primarily focused on the identification of patterns and trends associated with mobile network services and IP network Layers 3-7, where knowledge about IP and associated service characteristics may be most easily extracted. It is also recognized that an interesting application of data mining is its potential to predict future events—to some degree of statistical certainty—based on past trends or by correlating data sets that were previously regarded as unrelated. For example, rather than monitoring a well-defined set of data for an explicit or deterministic actionable threshold, the data analytics approach monitors (potentially unstructured) data patterns associated with historical trends and identifies probable consequences to those patterns. A network service provider may then choose to act in advance and in anticipation of such consequences to improve service value or network performance. Another example is that of police and security organizations who use similar techniques to predict the likelihood of a crime being committed.

It would advantageous to utilize data analytics in a network OAM capacity to predict network-related failures in advance.

BRIEF SUMMARY OF THE DISCLOSURE

In an exemplary embodiment, a computer-implemented method includes receiving network data from a network and non-network sourced data from one or more external sources relative to the network; performing data mining on the network data and the non-network sourced data; developing a predictive analytics model based on the data mining; and performing predictive analytics on the network data and the non-network sourced data using the predictive analytics model to detect likely future failures in the network. The network can include a Software Defined Network (SDN) control environment operating at any of Layers 0, 1, 2 or 3. The computer-implemented method can further include receiving the network data from the network via an SDN controller in the network via an Application Programming Interface (API) on the SDN controller. The computer-implemented method can further include receiving a notification from the predictive analytics that a network resource (such as a component, sub-system, system, device, facility, etc.) in the network is likely to fail; and performing a proactive maintenance activity on the resource. The computer-implemented method can further include continually updating the data mining and the predictive analytics model based on ongoing occurrences of failures and data associated therewith. The network data and the non-network data can each be classified as either analog or digital and either internal to the network or external to the network. The network data can include network Operations, Administration, and Maintenance (OAM) data collected by the network, and the non-network data can include data collected from external sources relative to the network.

In another exemplary embodiment, a system includes a network interface, a data store, and a processor, each communicatively coupled therebetween; and memory storing instructions that, when executed, cause the processor to: receive, via the network interface, network data from a network and non-network sourced data from one or more external sources relative to the network; perform data mining on the network data and the non-network sourced data; develop a predictive analytics model based on the data mining; and perform predictive analytics on the network data and the non-network sourced data using the predictive analytics model to detect likely future failures in the network. The network can include a Software Defined Network (SDN) control environment operating at any of Layers 0, 1, 2 or 3. The network data can be received from the network via an SDN controller in the network via an Application Programming Interface (API) on the SDN controller. Responsive to a failure prediction by the predictive analytics, a notification can be provided when a network resource (such as a component, sub-system, system, device, facility, etc.) in the network is likely to fail to alert an operator for proactive maintenance activity on the network resource. The memory storing instructions that, when executed, can further cause the processor to continually update the data mining and the predictive analytics model based on ongoing occurrences of failures and data associated therewith. The network data and the non-network data can each be classified as either analog or digital and either internal to the network or external to the network. The network data can include network Operations, Administration, and Maintenance (OAM) data collected by the network, and the non-network data can include data collected from external sources relative to the network.

In yet another exemplary embodiment, a network includes a plurality of network elements communicatively coupled therebetween and operating at any of Layers 0-3; a controller communicatively coupled to one or more of the plurality of network elements, wherein the controller includes a processor and memory storing instructions that, when executed, cause the processor to: receive, via the network interface, network data from a network and non-network sourced data from one or more external sources relative to the network; perform data mining on the network data and the non-network sourced data; develop a predictive analytics model based on the data mining; and perform predictive analytics on the network data and the non-network sourced data using the predictive analytics model to detect likely future failures in the network. The controller can include a Software Defined Network (SDN) controller, and wherein the network data can be received from the network via the SDN controller in the network via an Application Programming Interface (API) on the SDN controller. Responsive to a failure prediction by the predictive analytics, a notification can be provided when a network resource (such as a component, sub-system, system, device, facility, etc.) in the network is likely to fail to alert an operator for proactive maintenance activity on the network resource. The memory storing instructions that, when executed, can further cause the processor to continually update the data mining and the predictive analytics model based on ongoing occurrences of failures and data associated therewith. The network data and the non-network data can each be classified as either analog or digital and either internal to the network or external to the network. The network data can include network Operations, Administration, and Maintenance (OAM) data collected by the network, and the non-network data can include data collected from external sources relative to the network.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

Again, the use of big data or data analytics is recognized as a new and interesting approach to solution solving. In the context of proactive OAM systems and methods, instead of monitoring real-time data sets for a definitive threshold crossing, data analytics can review historical data trends and consequences to identify possible future outcomes (e.g., a network event) with a high degree of statistical probability. The application of data analytics to a network provides a wealth of new and proactive business opportunities in the area of network operations, network optimization, and service monetization. For network operations, in various exemplary embodiments, proactive OAM systems and methods use "big data" or "data analytics" techniques to observe changes to patterns in data collected from a network and other sources, such as via traditional Network Management Systems (NMS) or modern Software Defined Network (SDN) control systems. When a historical association between certain patterns and network events (such as equipment failures) is identified, it leads to an increase in confidence that when the same patterns show up in the future, they are likely to correlate with future network events (such as equipment failures). The proactive OAM systems and methods (i) use a combination of OAM data and other non-OAM data that is collected for purposes not directly related to traditional OAM monitoring, (ii) process collected data in a manner that is not typical for traditional OAM instrumentation, and (iii) provide a result that is predictive of, rather than responsive to, network behavior. The ability to predict network failures in advance provides a network operator with time to repair network equipment before it impacts a service. This improves network availability, increases customer loyalty and speeds up network repair and maintenance.

Figure 1:
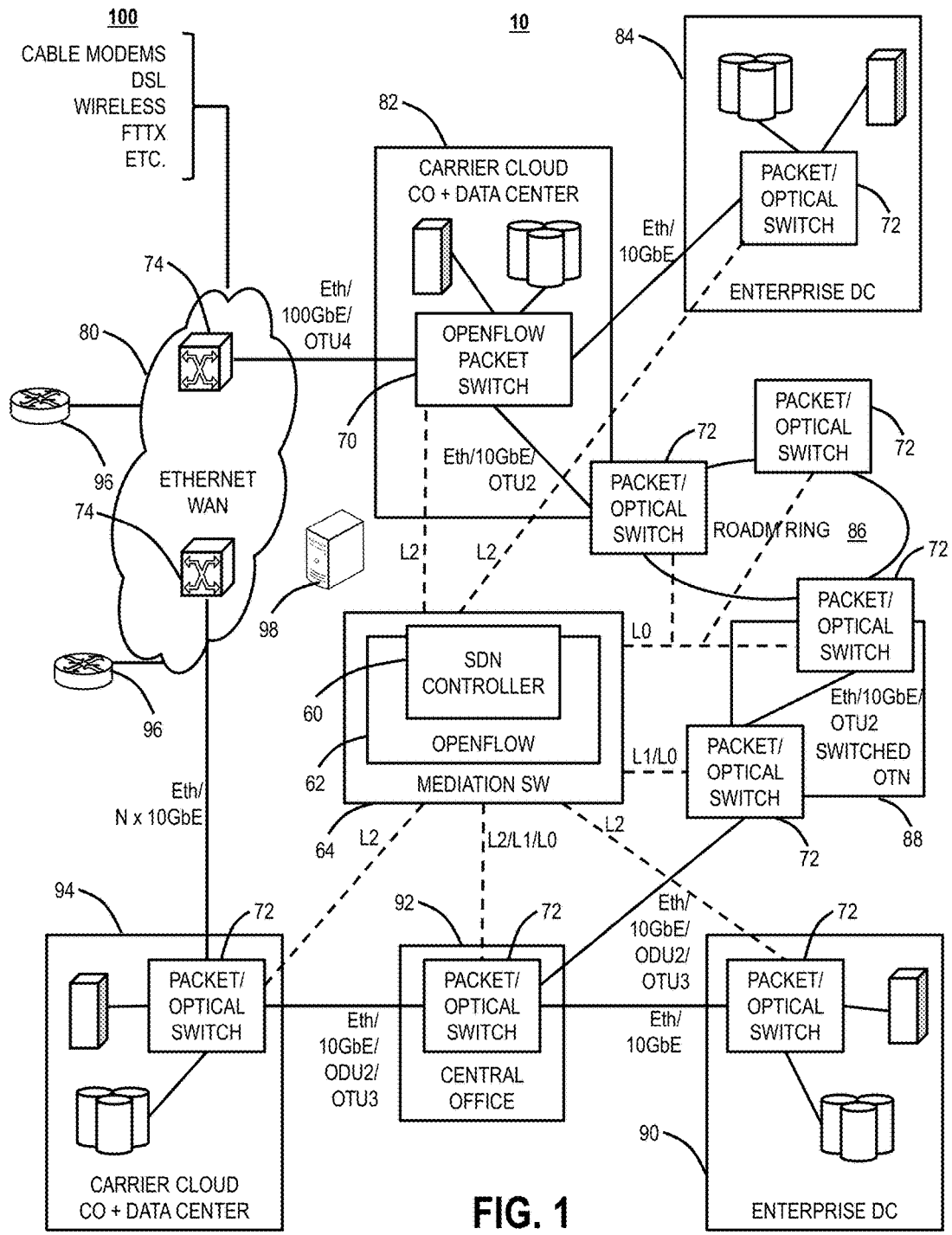
FIG. 1 is a network diagram of an exemplary network for describing the proactive OAM systems and methods.

Referring to FIG. 1, in an exemplary embodiment, a network diagram illustrates an exemplary network 10 for describing the proactive OAM systems and methods. Those of ordinary skill in the art will recognize that any network configuration at Layers 0, 1, 2, and/or 3 is contemplated with the proactive OAM systems and methods. The network 10 is a SDN network which includes an SDN controller 60 with the ability to (logically) centrally program provisioning of forwarding in the network 10 in order for more flexible and precise control over network resources to support new services. Application Programmable Interfaces (APIs) provide programmatic communication between an SDN controller and either (i) specific applications or (ii) programmable network devices. OpenFlow (www.openflow.org) is an example implementation of a special OpenFlow interface 62 from the SDN controller 60 to programmable network devices. It may or may not communicate via mediation software 64, to each switch 70, 72, 74 in the network 10 in order to provision the forwarding table at each switch along a connection path in order to instantiate the forwarding behavior needed for the connection. OpenFlow is described, for example, in the OpenFlow Switch Speciation, Version 1.1.0 (February 2011)—Version 1.3.0 (June 2012), the contents of which are incorporated by reference herein. While OpenFlow describes one version of a SDN interface, other SDN protocols besides OpenFlow (such as Netflow, REST, etc) are also contemplated with the systems and methods described herein.

Again, for illustration purposes, the network 10 includes an OpenFlow-controlled packet switch 70, various packet/optical switches 72, and packet switches 74 with the switches 70, 72 each communicatively coupled to the SDN controller 60 via the OpenFlow interface 62 and the mediation software 64 at any of Layers 0-3 (L0 being DWDM, L1 being OTN, and L2 being Ethernet). The switches 70, 72, 74, again for illustration purposes only, are located at various sites including an Ethernet Wide Area Network (WAN) 80, a carrier cloud Central Office (CO) and data center 82, an enterprise data center 84, a Reconfigurable Optical Add/Drop Multiplexer (ROADM) ring 86, a switched OTN site

88, another enterprise data center 90, a central office 92, and another carrier cloud Central Office (CO) and data center 94. The network 10 can also include IP routers 96 and a network management system (NMS) 98. Note, there can be more than one of the NMS 98, e.g., an NMS for each type of equipment—each communicatively coupled to the SDN controller 60. Again, the network 10 is shown just to provide context and typical configurations at Layers 0-3 in an SDN network for illustration purposes. Those of ordinary skill in the art will recognize various other network configurations are possible at Layers 0-3 in the SDN network.

The switches 70, 72, 74 can operate, via SDN, at Layers 0-3. The OpenFlow packet switch 70, for example, can be a large-scale Layer 2 Ethernet switch that operates, via the SDN controller 60, at Layer 2 (L2). The packet/optical switches 72 can operate at any of Layers 0-3 in combination. At Layer 0, the packet/optical switches 72 can provide wavelength connectivity such as via DWDM, ROADMs, etc., at Layer 1, the packet/optical switches 72 can provide time division multiplexing (TDM) layer connectivity such as via Optical Transport Network (OTN), Synchronous Optical Network (SONET), Synchronous Digital Hierarchy (SDH), etc., at Layer 2, the packet/optical switches 72 can provide Ethernet or Multi Protocol Label Switching (MPLS) packet switching and at Layer 3 the packet/optical switches can provide IP packet forwarding. The packet switches 74 can be traditional Ethernet switches that are not controlled by the SDN controller 60. The network 10 can include various end user access technologies 100, such as, without limitation, cable modems, digital subscriber loop (DSL), wireless, fiber-to-the-X (e.g., home, premises, curb, etc.), and the like.

The network 10 has various networking components that have associated OAM such as, for example, DWDM, OTN, SONET, SDH, Ethernet, Multiprotocol Label Switching (MPLS), IP, etc. Today's traditional method of instrumenting network performance involves network elements (e.g., the switches 70, 72, 74, 88) collecting lots of raw data associated with simple OAM packets and bytes. The raw data is uploaded at a coarse time interval (typically 15 minute bins) into a Network Management System (NMS) where it is organized according to a structured database and monitored for threshold crossing alarms. This approach is based on a narrow scope of cause and effect for each OAM mechanism. At Layer 0, with the introduction of coherent DWDM technology, the network 10 can have a suite of photonic data measured by the Digital Signal Processor (DSP) technology including, but is not limited to, information relating to the real time monitoring of pre-FEC Bit Error Ratio (BER), optical loss, optical propagation delay, and variations in power levels, optical amplifier gain, optical noise, optical signal to noise ratio, polarization and chromatic dispersion. At Layer 1, the network 10 can have access to a well-defined suite of OAM bytes defined by the ITU-T OTN standard (G.709) that include details of connection performance, continuity, connectivity and latency for end-to-end paths as well as individual links. At Layers 2 and 3, the network 10 can have access to packet OAM statistics defined by standards organizations like MEF, IEEE, ITU-T and IETF for Ethernet, MPLS and IP packet flows and tunnels. Currently, this OAM data is collected and monitored on a per-layer basis, it is directly associated with the layer service in question and it is monitored in pseudo real time.

In the context of the proactive OAM systems and methods described herein, the SDN controller 60 and associated applications thereon are continually monitoring OAM and performance monitoring data over time in the network 10. The proactive OAM systems and methods take advantage of the SDN paradigm to access relevant network data through open Application Programming Interfaces (APIs) such as associated with the SDN controller 60. Data sourced from different networking locations is collected in a database that is independent of other existing functional databases to maintain independence and security. Data collected from the local network is combined with data pushed to the Internet from external, global sources. A data analytics computation of the proactive OAM systems and methods operates on its dedicated data set independently of other network databases.

Figure 2:
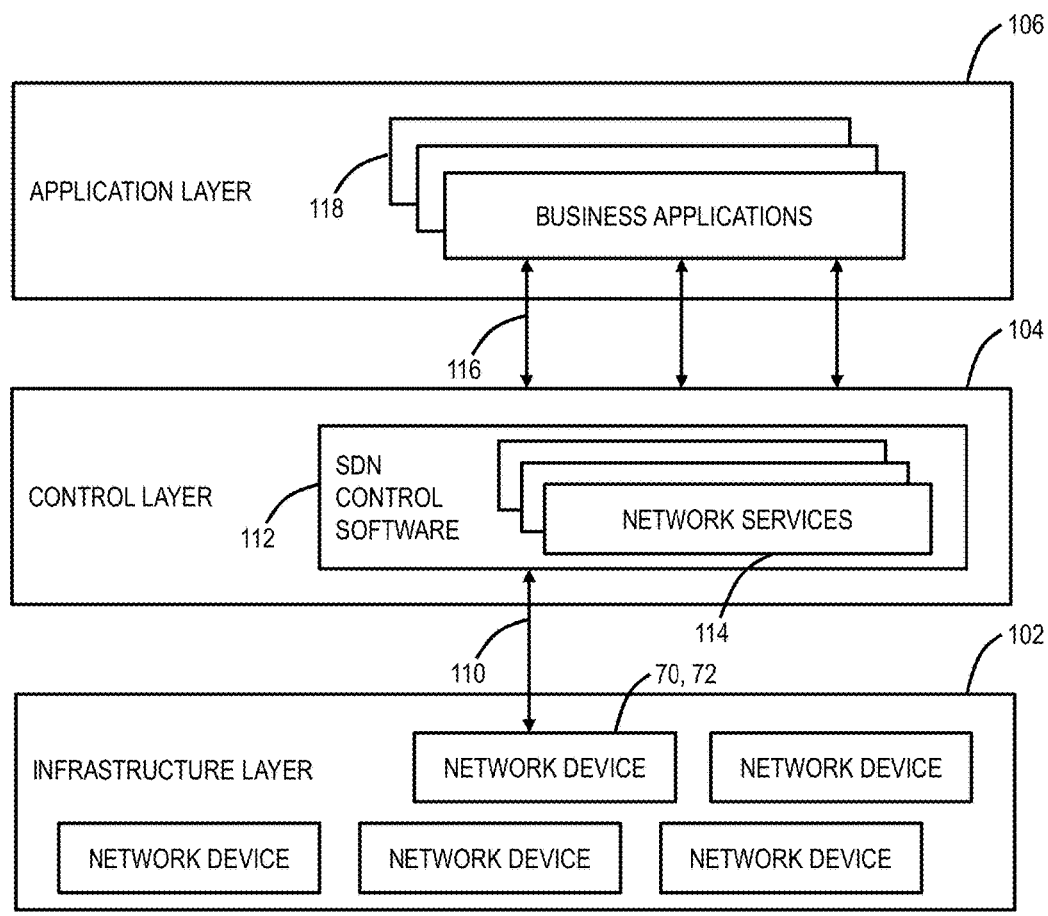
FIG. 2 is a block diagram of functional components of an SDN controller in the exemplary network of FIG. 1.
Figure 3:
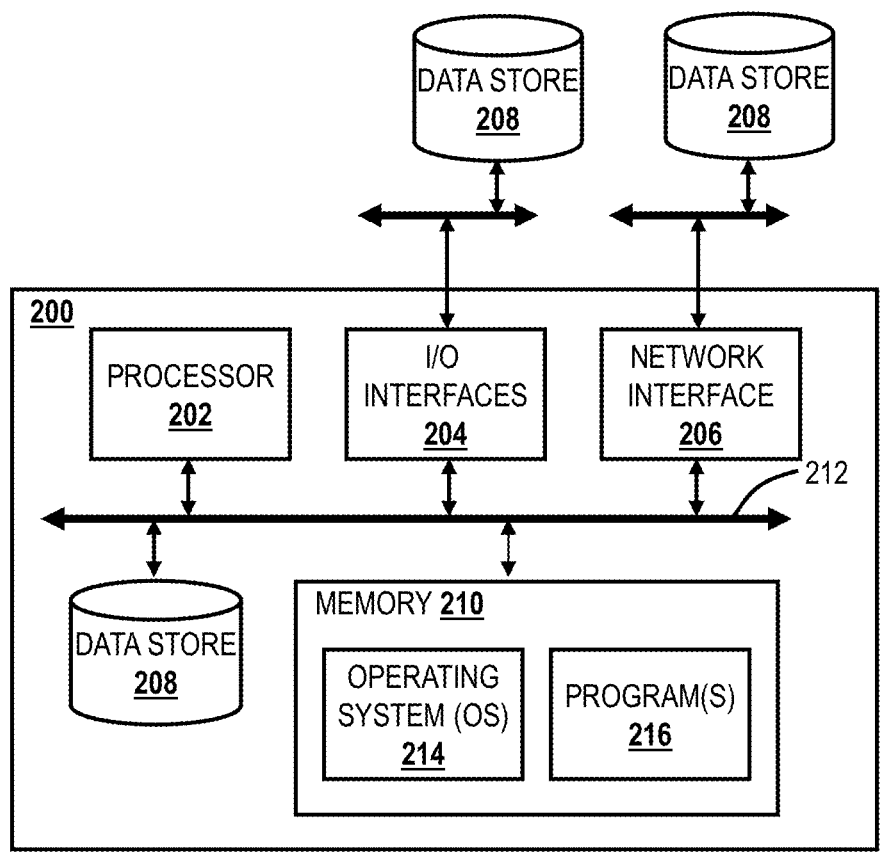
FIG. 3 is a block diagram of a server which may be used to implement the SDN controller of FIG. 2.

Referring to FIG. 2, in an exemplary embodiment, a block diagram illustrates functional components of the SDN controller environment 60. The SDN controller 60 functions 104 and 106 can be implemented on a server or the like such as illustrated in FIG. 3 and the functional components can be implemented in software executed on the server. The SDN controller environment 60 includes a programmable infrastructure layer 102, a control layer 104, and an application layer 106. The programmable infrastructure layer 102 comprises network devices such as the switches 70, 72 and is communicatively coupled to the control layer 104 via a control plane interface 110 such as OpenFlow, for example. The control layer 104 facilitates communication between the application layer 106 and the network devices 70, 72 located in programmable infrastructure layer 102. The control layer 104 includes SDN control software 112 with a plurality of network services 114. The control layer 104 provides SDN functionality to manage network services through abstraction of lower level functionality. The application layer 106 communicates to the control layer 104 through various Application Programming Interfaces (APIs) 116. The application layer 106 provides end user connectivity to the SDN such as software modules and/or functions responsible for creating desired path and flow connections on the physical network through various business applications 118. In an exemplary embodiment, the proactive OAM systems and methods are implemented as one of the business applications 118 on the SDN controller 60 and/or on a separate server 200.

Referring to FIG. 3, in an exemplary embodiment, a block diagram illustrates a server 200 which may be used to realize the SDN controller 60, in other systems, or standalone. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touch pad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the Internet, a wide area network (WAN), a local area network (LAN), and the like, etc. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Figure 4:
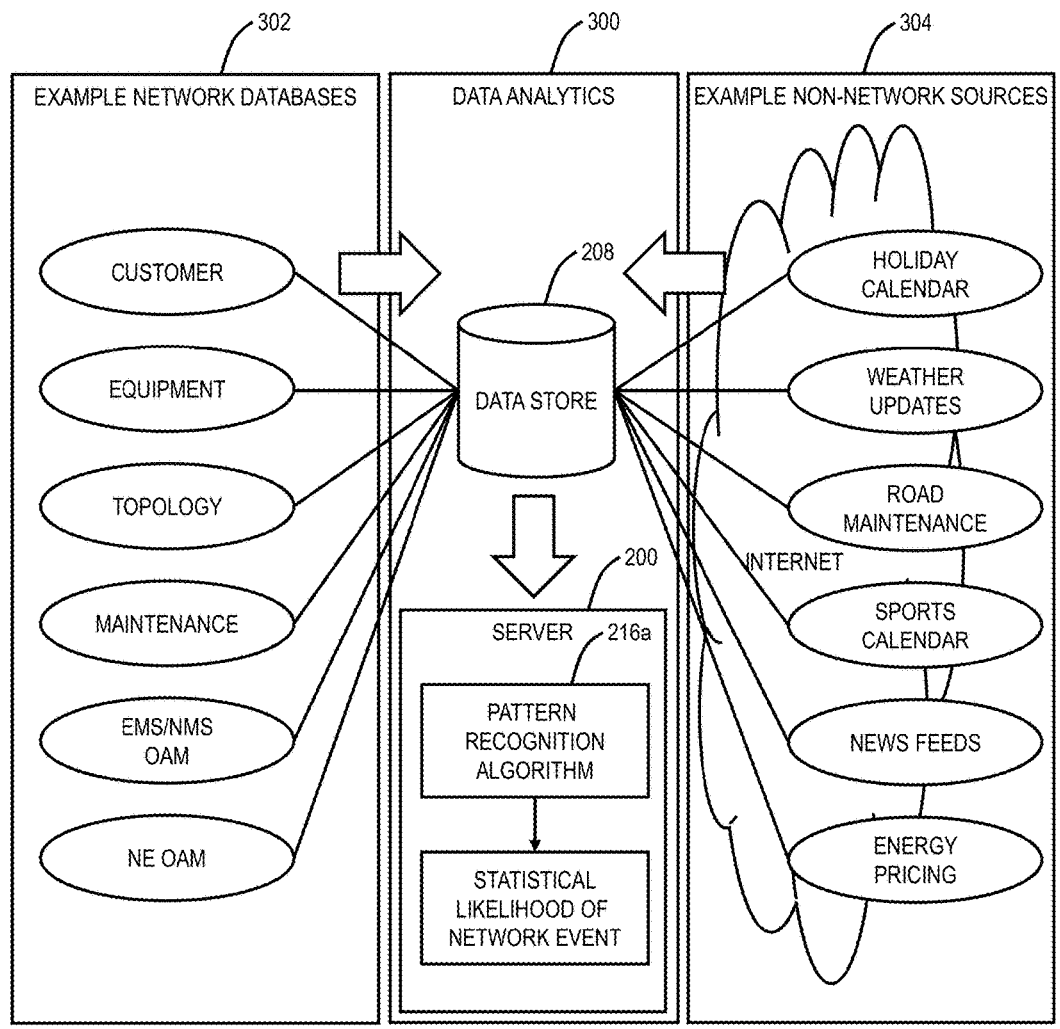
FIG. 4 is, a logical flow diagram of a data analytics system for predicting a statistical likelihood of a network event from network data and non-network sourced data which is collectively OAM data.

Referring to FIG. 4, in an exemplary embodiment, a logical flow diagram illustrates a data analytics system 300 for predicting a statistical likelihood of a network event from network data 302 and non-network sourced data 304. Collectively, the network data 302 and the non-network sourced data 304 can be referred to as OAM data. The data analytics system 300 can be implemented, for example, through the server 200 and the data store 208 (which can be internal or external to the server 200). Alternatively, the data analytics system 300 can be implemented in the SDN controller environment 60, and other embodiments are also contemplated. The data store 208 is configured to interface to the network data 302 such as via APIs through the SDN controller environment 60, i.e. various network data can be exposed across open APIs. Examples of the network data 302 can include, without limitation, customer data, equipment data, topology data, maintenance data, EMS/NMS OAM data, and NE OAM data. The data store 208 is also configured to interface to the non-network sourced data 304 such as over the Internet. For example, the non-network sourced data 304 can be pushed to the data store via subscriptions over the Internet. Examples of the non-network sourced data 304 include, without limitation, holiday calendars, weather updates, road maintenance notices, sports calendars, news fees, energy pricing, etc. The server 200 includes a pattern recognition algorithm 216a that analyzes all of the data from the data store 208, i.e. the network data 302 and the non-network sourced data 304, to predict statistical likelihoods of network events.

The idea that, by observing the network 10, one can predict the occurrence of a failure in advance is attractive. If a network operator can get sufficient advance notice, the operations team can act to repair or move service traffic around the anticipated failure location in a managed manner, minimizing impact to customer services. By combining the above OAM expertise at Layer 0 through 3 with data analytical techniques, the data analytics system 300 has an opportunity to advance network operations with predictive fault analysis. As the network data 302 is collected over time, it is possible to identify patterns in the network data 302 along with the non-network sourced data 304 that exist consistently prior to actual network failures. With the supply of additional information such as previously known bad sites or known fiber type (or quality), or fiber splice age, it may become possible to predict the timing of a network failure with high enough probability that a network operator can plan around the failure before it happens. This allows the operations team to troubleshoot (recurring) events or correct instable network fluctuations before they become a revenue impacting action. Further, such knowledge aids in the development of a cost efficient sparing strategy, as spare equipment would then be located at distribution sites closest to locations identified to trend the highest probability failure rates.

In the context of predictive analytics, it is possible to consider the addition of the non-network sourced data 304 to aid in proactive resiliency. For example, in addition to the observation of the network data 302, by monitoring weather conditions, such as for hurricane data, it becomes possible to anticipate a need for network backup in advance and away from the predicted weather disturbance. By providing sufficient advanced warning, network capacity may be redirected temporarily to the area in need so as to accommodate overload conditions. Similarly, emergency information provided by monitoring real-time news broadcasts provides an opportunity for the network operator to re-prioritize network traffic in anticipation of network stress.

In the data analytics system 300, data from many different network sources such as OAM from different network layers, knowledge about nodal failure history, knowledge about operations teams' maintenance events, i.e., any knowledge about and relating to the network is fed to the pattern recognition algorithm 216a. The raw data is archived and, when an event such as a link failure or an interface failure occurs, the raw data from all sources is analyzed for prior "tell-tale" patterns. After the occurrence of a number of events, the pattern recognition algorithm 216a in the analytics engine recognizes a consistent pattern of data changes prior to the event. The correlation between this pattern and the likelihood of an event occurring grows as more data is collected. Ultimately, the identification of a unique data pattern leads to a statistical probability that an event will occur in the future (as a consequence of the existence of the data pattern).

The data collected in the data store 208 may be categorized and prioritized to aid the pattern recognition process. In an exemplary embodiment, the data collected in the data store 208 can be categorized in six categories and stamped with information associated with time of occurrence and geographic location. The six categories include (i) Digital and (ii) Analog data is collected from (iii) Internal and (iv) External sources associated with (v) Network and (vi) non-Network environments. The network data 302 is collected from OAM data sourced across different network layers, and the non-network sourced data 304 is collected from external subscription sources, etc. Digital data includes data, which is true/false, i.e., 1 or 0 whereas analog data is a numerical value. The scope of internal/external may refer to a network operator (external) or a vendor (internal), i.e., internal is within the network 10 (owned by an operator) whereas external is outside the network 10 (not owned by the operator). Today, the world is becoming increasingly instrumented. Consequently, input data can come from a wide range of sources. A non-exhaustive list of some examples of data that can be monitored and can impact the behavior of a network are shown in the following table:

| Example Data | Dig. | Anal. | Int. | Ext. | Network | Non-Network |
|---|---|---|---|---|---|---|
| Right of way maintenance (road, rail) | X | | | X | | X |
| Public events (sports, holidays) | X | | | X | | X |
| Transport timetables (train location) | | X | | X | | X |
| Astronomic events (moon/tides, solar) | | X | | X | | X |
| Weather events (temperature, pressure) | | X | | X | | X |
| Atmospheric events (temperature, wind) | | X | | X | | X |
| Power supply (vendor, costs) | | X | | X | | X |
| Popular content (movies, news) | | X | | X | X | |
| Internet gateway source | | X | | X | X | |
| Choice of wholesale bandwidth provider | | X | | X | X | |
| Restoration or protection event | X | | X | | X | |
| Customer SLA history | X | | X | | X | |
| Fiber cut | X | | X | | X | |
| Fiber characteristics (age, spice dates) | X | | X | | X | |

| Example Data | Dig. | Anal. | Int. | Ext. | Network | Non-Network |
|---|---|---|---|---|---|---|
| Equipment choice (vendor, components) | X | | X | | X | |
| Optical power threshold | X | | X | | X | |
| WDM frequency | X | | X | | X | |
| Network maintenance action | X | | X | | X | |
| Loss of Signal, Frame | X | | X | | X | |
| Section, Path alarms | X | | X | | X | |
| Network maintenance schedule | | X | X | | X | |
| Operations team personnel | | X | X | | X | |
| Optical SNR | | X | X | | X | |
| Optical power values | | X | X | | X | |
| Pre-FEC BER | | X | X | | X | |
| Chromatic dispersion | | X | X | | X | |
| Polarization PMD | | X | X | | X | |
| Polarization PDL | | X | X | | X | |
| Link utilization | | X | X | | X | |
| Packet Delay | | X | X | | X | |
| Packet Delay Variation | | X | X | | X | |
| Packet Loss | | X | X | | X | |
| Packet Continuity | | X | X | | X | |
| Buffer utilization | | X | X | | X | |
| Timing synchronization | | X | X | | X | |

The data collected in the data store 208 may be pre-sorted or prioritized to aid the pattern recognition process based on network operator's priorities, perceived importance or the data's temporal characteristics. For example, there may be many data inputs associated with laser current levels or optical amplifier pump power levels and a few data inputs associated with a network operator's choice of vendor device. In such a case, a pattern recognition algorithm may support different prioritization levels (for example, high priority for the small number of data inputs and lower priority for the large number of data inputs). Such an approach may make the implementation of the algorithm easier when faced with very large volumes of data. Also, different data types may be classified as dynamic and static. Some data is constantly changing (or changes over short timescales) whereas some data is fixed (or only changes over long timescales). For example, the measurement of polarization mode dispersion (PMD) in an optical fiber can fluctuate widely based on the amount of stress placed on the fiber, whereas a train timetable is fixed.

Different network operators will have access to different types of data and may choose to limit the data set that is analyzed by the pattern recognition algorithm 216a. The data collected in the data store 208 may be pre-sorted into sub-groups for analysis based on a network operator's preference. For example, an initial implementation of this invention may be to use internal OAM data only. The pattern recognition algorithm may act usefully on a sub-set of data that comprises only internal (conventional) OAM data from different internal network layers. An evolution to this approach may be to add the location of device equipment and its association with equipment vendor. A further evolution to this data set may be to add temperature and humidity information associated with each network office.

Again, the network 10 generates data at different network layers to support the instrumentation of different network technologies. Today, this data is monitored to gain explicit knowledge about its local significance to a single system or sub-system, i.e., the data has local meaning Instrumentation systems operate at a given network layer but they are typically not combined with each other to determine broader global network significance. Non-OAM data about the network 10 also has relevance. Different equipment vendors using different component choices with different temperature responses may be used in different geographic locations. For example, a problem may only show up when one vendor's product is exposed to excessive humidity or altitude. The non-network sourced data 304 provides information about possible global environmental impacts to the network 10. Many of the data sources are made available for public consumption. For example, news items or weather updates are pushed to our smartphone apps, calendars remind us of important events such as a significant sports game or a national holiday and local authorities advertise when roads are going to be closed for maintenance. Competing energy companies advertise their energy rates for different applications in different geographies and train timetables advertise when trains are expected to pass through certain geographies. The data analytics system 300 taps into these apparently unassociated data streams for recognizing patterns that affect the network 10. As evolution towards the Internet of Things (IoT) occurs, the range and scale of possible data sources will increase. Billions of communication sessions (e.g. to/from refrigerators, thermostats and light bulbs) will in themselves provide a sensor network that will generate a significantly larger data set for analysis.

The network data 302 includes OAM data and the like collected by the network 10. For example, the network data 302 can be from Layers 0-3. At Layer 0 (DWDM), the network data 302 can include information about fiber cut, fiber characteristics (age, spice dates), equipment choice (vendor, components), optical power threshold, WDM frequency, optical signal-to-noise ratio (SNR), optical power values, pre-FEC BER, chromatic dispersion, polarization mode dispersion (PMD), polarization dependent loss (PDL), etc. At Layer 1 (OTN), the network data 302 can include restoration or protection event, customer service level agreement (SLA) history, Network maintenance action, Loss of Signal, Loss of Frame, Section, Path alarms, Network maintenance schedule, etc. At Layers 2 and 3 (packet), the network data 302 can include Link utilization, Packet Delay, Packet Delay Variation, Packet Loss, Packet Continuity, Buffer utilization, Timing synchronization, etc. Of course, some of the network data 302 is directly correlated to service outages, e.g., no optical power, extremely high pre-FEC BER, Loss of Signal/Frame, etc. The goal of the data analytics system 300 is to take massive amounts of data and look for correlations that frequently occur in advance of service outages, e.g., correlations that are not necessarily obvious.

In the data analytics system 300, the data 302, 304 is collected and machine pattern recognition techniques are performed based on supervised or unsupervised learning techniques to determine the probability of future events. For example, a training set of data may be generated through prior monitoring of data sets and actual network events. In the public domain, many pattern recognition algorithms exist that are used to identify patterns of information from large (seemingly noisy) data sets. The pattern recognition algorithm 216a contemplates any choice of algorithm. Temporal-spatial event correlation analysis is then performed on the statistically classified output from the pattern recognition algorithm 216a using the time and location information associated with each data source to predict the statistical probability of time and location of future events.

While the source data is contextual, it is not obvious that the pattern recognition algorithm 216a may need to understand the context of the source data. What is important is the relative change in each value and the identification of a pattern of changes across multiple data sources that result in a consequential network event. Each data source will have a baseline value that represents steady state (and healthy operation). Deviation from this value beyond an identified threshold in terms of rate of change and absolute new value (local to the context of the data) both represent input to the prediction process. The ability to index data and remove it from its contextual environment provides an opportunity to simplify the computation process.

Again, today's network architecture may be classified as closed and proprietary. The flow of information is constrained for use within rigid functional boundaries. For example, OAM information flow between network elements is typically constrained to a single network technology and, while reactive results are shared with an operations support system (OSS), they are typically not shared outside the scope of the OAM process. While interfaces between hardware and/or software systems may be standardized, information flow and access to information databases is limited. (Note that partitioning and restrictions are often encouraged for security reasons.) A consequence of this rigid structure is that it is difficult to gain access to the different data sources described above for application reasons (e.g., the pattern recognition algorithm 216a).

Within the network 10, the new software defined networking (SDN) control paradigm provides a better opportunity for practical implementation of the data analytics system 300. SDN promotes the use of open Application Programming Interfaces (APIs) between different network systems to enable increased network flexibility through network element programmability. In the data analytics system 300, it is proposed that flexible API's be programmed to expose the data types described above and streamline the flow of data through the SDN controller environment 60 to the data analytics data store 208. Sources of external data are increasingly pushing data out to the Internet for subscribers to access. It is proposed that the data analytics data store 208 subscribes to these information flows as well.

In the network 10 and the data analytics system 300, some of the OAM data can be separated out and used for simple, minimal computation to predict future failures. This OAM data is directly correlated with failures and examples can include, without limitation, laser pump current, FEC BER, etc. That is, e.g., a trend where the FEC increases, the laser pump current decreases/increases, etc. can directly predict a future failure. Other OAM data may not have such a direct correlation effect that is easily noticeable, but may have correlation when combined with other OAM data. This is an exemplary objective of the data analytics system 300—take as much OAM data is possible, perform predictive analytics, and determine to some statistical likelihood a future failure. For example, the data analytics system 300 can identify OAM data that can be watched and learned as "network normal", and flag when "abnormal" happens, but not necessarily knowing if that would cause any issues. For example, a rare predicted weather problem might be such an event, a prolonged dry spell combined with record heat, etc. The data analytics system 300 can also identify OAM data that can be watched and that has caused network problems often enough for data analytics system 300 to have learned some specifics about them such that the data analytics system 300 can identify such occurrences in advance.

Figure 5:
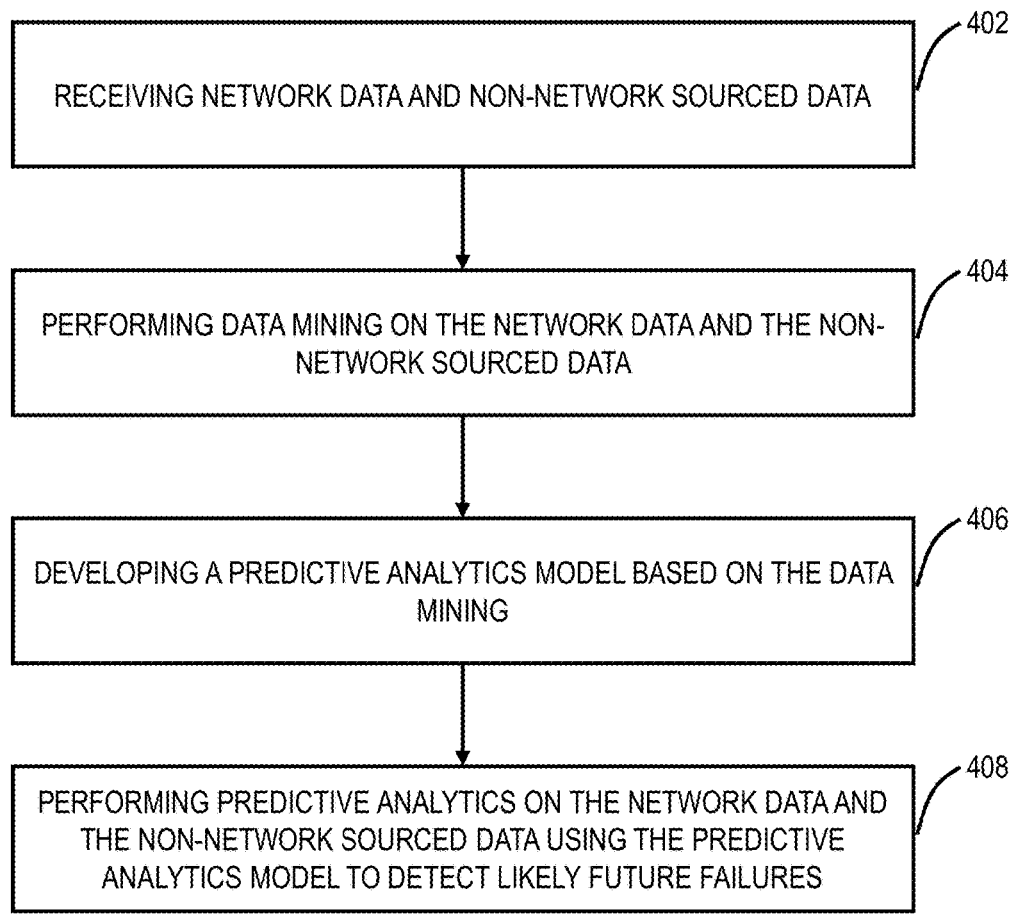
FIG. 5 is a flowchart of a pattern recognition method that can be implemented through the data analytics system.

Referring to FIG. 5, in an exemplary embodiment, a flowchart illustrates a pattern recognition method 400 that can be implemented through the data analytics system 300.

The pattern recognition method 400 can be implemented as the pattern recognition algorithm 216a. The pattern recognition method 400 includes receiving network data and non-network sourced data (step 402). Here, the data analytics system 300 can continually receive the network data 302 from the SDN controller environment 60 and the non-network sourced data 304 from various sources as described herein. The network data 302 can be received at periodic intervals, e.g., every minute, 15 minutes, etc., as is common with OAM data. The non-network sourced data 304 can also be received at periodic intervals or continually. Specifically, the data analytics system 300 is set up to continually receive the OAM data (i.e., the network data 302 and the non-network sourced data 304) and to perform various predictive techniques to determine a prospective failure in the network 10.

The pattern recognition method 400 includes performing data mining on the network data and the non-network sourced data (step 404). Here, in the data mining, the pattern recognition method 400 looks to analyze the network data and the non-network sourced data to identify underlying trends, patterns, or relationships for "normal" network operation and "abnormal" network operation. That is, the data mining is used to develop, from the vast amount of OAM data (the network data and the non-network sourced data), a predictive model for determining a prospective failure in the network. The data mining is used to gather knowledge about relationships and correlation between different data points in the OAM data, e.g., data that is not necessarily known to be directly correlated based solely on a priori knowledge. The benefit of data mining is it catalogs relationships and correlation between the OAM data regardless of what causes the relationship. For example, the data mining may determine there is a correlation between humidity and failures of a particular device or model in the network 10, etc.

In the pattern recognition method 400, the data mining includes an automatic or semi-automatic (e.g., operator involvement to guide the analysis) analysis of large quantities of data, i.e., the network data and the non-network sourced data, to extract previously unknown interesting patterns. The pattern recognition method 400 contemplates use of any data mining technique to identify so-called normal and abnormal network operations. Generally, the data mining can include, without limitation, anomaly detection (detection of unusual data or errors), association learning (searching for relationships between data), clustering (discovering groups or structures in the data that is some way related or similar without using known structures in the data), classification (generalizing known structure to apply to new data), regression (attempt to find a function which models the data with low error), summarization (providing compact representation of the data), etc. Additionally, the validity of the overall patterns and correlations determined by the data mining can be continually checked by various statistical algorithms to see if these patterns and correlations are correctly predicting failures, and these updates can further be used to refine the data mining. This data mining step can also be viewed as a training step.

The pattern recognition method 400 includes developing a predictive analytics model based on the data mining (step 406). The data mining can be viewed as gathering knowledge and the resulting predictive analytics model is applying that knowledge to determine or predict events. The pattern recognition method 400 contemplates using any predictive analytics model such as, without limitation, regression models (linear, logistic, multinomial logistic, probit, splines, etc.), time series models, survival analysis, decision learning, machine learning techniques, neural networks, Hierarchical Temporal Memory, etc. For example, the pattern recognition method 400 can include a self-organizing map technique to determine out-of-normal operation for the network 10 and associated network resources (such as a component, sub-system, system, device, facility, etc.). Other embodiments are also contemplated.

The pattern recognition method 400 includes performing predictive analytics on the network data and the non-network sourced data using the predictive model to detect likely future failures (step 408). Here, after the pattern recognition method 400 has established a sufficiently trained predictive analytics model based on the data mining, the pattern recognition method 400 can operate over time to provide proactive OAM in the network 10. The output of this step is a statistical likelihood of a failure in the network 10. For example, the pattern recognition method 400 can direct a network operator to a potential failure, i.e., an infrastructure hotspot, in the network 10 in advance so the network operator can perform proactive maintenance before the failure instead of reactive maintenance after the failure. That is, the pattern recognition method 400 can provide a notification from the predictive analytics that a network resource in the network is likely to fail, and the network operator can perform a proactive maintenance activity on the network resource. Further, this step can be continually used to provide feedback in the pattern recognition method 400 for better training to improve the pattern recognition.

The proactive OAM systems and methods provide novel techniques to adapt emerging big data or data analytics techniques to review historical trends and consequences in the network 10 to identify possible future outcomes with a high degree of statistical probability. This is counter to the conventional OAM technique of real-time monitoring to detect a definitive threshold crossing. In use, the proactive OAM systems and methods are advantageous in network operations, network optimization, and service monetization. For network operation, the proactive OAM systems and methods allow a network operator to monitor network health so as to identify infrastructure hotspots and possible future failure modes in advance. For network optimization, the proactive OAM systems and methods allow the network operator to proactively manage bandwidth resources so as to optimize for efficiency and cost such as, for example, relying on less protection bandwidth based on an ability to prevent failures. For service monetization, the proactive OAM systems and methods allow the network operator to apply dynamic pricing strategies based on dynamic traffic patterns and historical customer trends.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A computer-implemented method, comprising:
receiving network data from a network and non-network sourced data from one or more external sources relative to the network, wherein the non-network sourced data is obtained separately from the network, and wherein the network data is obtained from a Software Defined Network (SDN) controller that consolidates the network data from network elements operating at various Layers and from different equipment vendors;
performing data mining on the network data and the non-network sourced data to identify normal operation and abnormal operation in the network;
developing a predictive analytics model based on the data mining; and
performing predictive analytics on the network data and the non-network sourced data using the predictive analytics model to detect likely future failures in the network based on the normal operation and the abnormal operation in the network and associated trends, patterns, or relationships determined in the predictive analytics model using the network data and the non-network sourced data.

2. The computer-implemented method of claim 1, wherein the
SDN controller provides the network data via an Application Programming Interface (API).

3. The computer-implemented method of claim 1, further comprising:
receiving a notification from the predictive analytics that a component in the network is likely to fail; and
performing a proactive maintenance activity on the component.

4. The computer-implemented method of claim 1, further comprising:
continually updating the data mining and the predictive analytics model based on ongoing occurrences of failures and data associated therewith.

5. The computer-implemented method of claim 1, wherein the network data and the non-network data are each classified as either analog or digital and either internal to the network or external to the network and prioritized.

6. The computer-implemented method of claim 5, wherein the network data comprises network Operations, Administration, and Maintenance (OAM) data collected by the network, and the non-network data comprises data collected from external sources relative to the network.

7. A system, comprising:
a network interface, a data store, and a processor, each communicatively coupled; and
memory storing instructions that, when executed, cause the processor to:
receive, via the network interface, network data from a network and non-network sourced data from one or more external sources relative to the network, wherein the non-network sourced data is obtained separately from the network, and wherein the network data is obtained from a Software Defined Network (SDN) controller that consolidates the network data from network elements operating at various Layers and from different equipment vendors;
perform data mining on the network data and the non-network sourced data to identify normal operation and abnormal operation in the network;
develop a predictive analytics model based on the data mining; and
perform predictive analytics on the network data and the non-network sourced data using the predictive analytics model to detect likely future failures in the network based on the normal operation and the abnormal operation in the network and associated trends, patterns, or relationships determined in the predictive analytics model using the network data and the non-network sourced data.

8. The system of claim 7, wherein the network data is received from the SDN controller via an Application Programming Interface (API).

9. The system of claim 7, wherein, responsive to a failure prediction by the predictive analytics, a notification is provided when a component in the network is likely to fail to alert an operator for proactive maintenance activity on the component.

10. The system of claim 7, wherein the memory storing instructions that, when executed, cause the processor to:
continually update the data mining and the predictive analytics model based on ongoing occurrences of failures and data associated therewith.

11. The system of claim 7, wherein the network data and the non-network data are each classified as either analog or digital and either internal to the network or external to the network and prioritized.

12. The system of claim 11, wherein the network data comprises network Operations, Administration, and Maintenance (OAM) data collected by the network, and the non-network data comprises data collected from external sources relative to the network.

13. A network, comprising:
a plurality of network elements communicatively coupled and operating at any of Layers 0, 1, 2 and/or 3, wherein two or more of the plurality of network elements are from different equipment vendors; and
a Software Defined Network (SDN) controller communicatively coupled to one or more of the plurality of network elements, wherein the SDN controller consolidates the network data from the plurality of network elements operating at the various Layers and from the different equipment vendors; and a server communicatively coupled to the SDN controller, wherein the server comprises a processor and memory storing instructions that, when executed, cause the processor to:
- receive, via a network interface, network data from a network and non-network sourced data from one or more external sources relative to the network, wherein the non-network sourced data is obtained separately from the network, and wherein the network data is obtained from the SDN controller;
- perform data mining on the network data and the non-network sourced data to identify normal operation and abnormal operation in the network;
- develop a predictive analytics model based on the data mining;
- perform predictive analytics on the network data and the non-network sourced data using the predictive analytics model to detect likely future failures in the network; and
- locate spares throughout the network based on the likely future failures.

14. The network of claim 13, wherein the network data is received from the SDN controller via an Application Programming Interface (API) on the SDN controller.

15. The network of claim 13, wherein, responsive to a failure prediction by the predictive analytics, a notification is provided when a component in the network is likely to fail to alert an operator for proactive maintenance activity on the component.

16. The network of claim 13, wherein the memory storing instructions that, when executed, cause the processor to:
- continually update the data mining and the predictive analytics model based on ongoing occurrences of failures and data associated therewith.

17. The network of claim 13, wherein the network data and the non-network data are each classified as either analog or digital and either internal to the network or external to the network and prioritized.

18. The network of claim 17, wherein the network data comprises network Operations, Administration, and Maintenance (OAM) data collected by the network, and the non-network data comprises data collected from external sources relative to the network.

\* \* \* \* \*